United States Patent
Liu et al.

(10) Patent No.: US 12,066,288 B1
(45) Date of Patent: Aug. 20, 2024

(54) TOOL AND METHOD FOR MEASURING PERPENDICULARITY AND ANGLE OF FEMUR OF VEHICLE CRASH DUMMY

(71) Applicants: CHINA AUTOMOTIVE TECHNOLOGY AND RESEARCH CENTER CO., LTD., Tianjin (CN); CATARC AUTOMOTIVE TEST CENTER (TIANJIN) CO., LTD., Tianjin (CN)

(72) Inventors: Zhixin Liu, Tianjin (CN); Mei Lu, Tianjin (CN); Weidong Liu, Tianjin (CN); Yongqiang Wu, Tianjin (CN); Zhi Li, Tianjin (CN); Zihe Meng, Tianjin (CN); Kai Wang, Tianjin (CN); Hanxiao Zhang, Tianjin (CN); Ye Hao, Tianjin (CN); Manli Liu, Tianjin (CN)

(73) Assignees: CHINA AUTOMOTIVE TECHNOLOGY AND RESEARCH CENTER CO., LTD., Tianjin (CN); CATARC AUTOMOTIVE TEST CENTER (TIANJIN) CO., LTD., Tianjin (CN)

( * ) Notice: Subject to any disclaimer, the term of this patent is extended or adjusted under 35 U.S.C. 154(b) by 0 days.

(21) Appl. No.: 18/529,281

(22) Filed: Dec. 5, 2023

(30) Foreign Application Priority Data

Jul. 7, 2023 (CN) .......................... 202310826233.6

(51) Int. Cl.
*G01B 5/245* (2006.01)
*G01B 5/00* (2006.01)
*G09B 23/32* (2006.01)

(52) U.S. Cl.
CPC .......... *G01B 5/245* (2013.01); *G01B 5/0004* (2013.01); *G09B 23/32* (2013.01)

(58) Field of Classification Search
CPC ...... A61B 5/107; A61B 5/1071; G01B 5/245; G01B 5/0004
(Continued)

(56) References Cited

U.S. PATENT DOCUMENTS

| 4,235,025 A | * | 11/1980 | Kortge | ................... G09B 23/32 |
| | | | | 434/274 |
| 5,090,267 A | * | 2/1992 | Gramling | ................ F16H 1/225 |
| | | | | 74/427 |

(Continued)

FOREIGN PATENT DOCUMENTS

| CN | 101718946 A | 6/2010 |
| CN | 102319081 A | 1/2012 |

(Continued)

OTHER PUBLICATIONS

First Office Action issued in counterpart Chinese Patent Application No. 202310826233.6, dated Aug. 8, 2023.

*Primary Examiner* — George B Bennett
(74) *Attorney, Agent, or Firm* — Westbridge IP LLC

(57) ABSTRACT

Disclosed are a tool and a method for measuring a perpendicularity and an angle of a femur of a vehicle crash dummy. The tool includes: a base, where the base is provided with a guide ring gear; and a clamp assembly, where the clamp assembly is configured to clamp a femur part. A measurement assembly can measure the perpendicularity and the angle of the femur part conveniently.

9 Claims, 11 Drawing Sheets

(58) Field of Classification Search
USPC .......................................................... 33/512
See application file for complete search history.

(56) References Cited

U.S. PATENT DOCUMENTS

| | | | | |
|---|---|---|---|---|
| 7,892,240 | B2 * | 2/2011 | Claypool | A61B 90/06 |
| | | | | 600/595 |
| 9,916,775 | B2 * | 3/2018 | McInnis | G09B 23/32 |
| 10,863,995 | B2 * | 12/2020 | Nielsen | A61B 17/157 |
| 11,166,861 | B2 * | 11/2021 | Pitt | A61G 5/10 |
| 11,234,888 | B2 * | 2/2022 | Mooney | A61B 5/6811 |
| 2006/0142671 | A1 * | 6/2006 | Solak | A61B 5/4528 |
| | | | | 600/595 |
| 2012/0277745 | A1 * | 11/2012 | Lizee | A61B 17/1739 |
| | | | | 606/59 |
| 2017/0087042 | A1 * | 3/2017 | Cho | A61H 3/00 |
| 2022/0117125 | A1 * | 4/2022 | Tudman | B25J 9/0096 |
| 2023/0008956 | A1 * | 1/2023 | Park | B23K 37/0443 |
| 2023/0044626 | A1 * | 2/2023 | Sakai | B23Q 1/25 |
| 2023/0084834 | A1 * | 3/2023 | Sakai | B23Q 11/12 |
| | | | | 108/139 |

FOREIGN PATENT DOCUMENTS

| | | | |
|---|---|---|---|
| CN | 102416582 | A | 4/2012 |
| CN | 102551995 | A | 7/2012 |
| CN | 202453198 | U | 9/2012 |
| CN | 204831144 | U | 12/2015 |
| CN | 106404420 | A | 2/2017 |
| DE | 102014223412 | B4 | 7/2018 |

\* cited by examiner

TOOL AND METHOD FOR MEASURING PERPENDICULARITY AND ANGLE OF FEMUR OF VEHICLE CRASH DUMMY

CROSS-REFERENCE TO RELATED APPLICATIONS

This application claims priority to Chinese Patent Application No. 202310826233.6, filed on Jul. 7, 2023 and entitled "Tool and Method for Measuring Perpendicularity and Angle of Femur of Vehicle Crash Dummy", the content of which is incorporated herein by reference in its entirety.

TECHNICAL FIELD

The present disclosure generally relates to the technical field of vehicle safety crash dummies, in particular to a tool and a method for measuring a perpendicularity and an angle of a femur of a vehicle crash dummy.

BACKGROUND

Vehicle passive safety testing technology is used for testing a vehicle occupant protection system. During such testing, a crash dummy is essential, and its measured values can be used for accurately evaluating the rationality of design of a vehicle occupant restraint system.

An existing vehicle crash dummy has a complex skeleton structure and involves numerous machining technologies, for example, welding of femur skeletons. Since a femur of the crash dummy is formed through three cylindrical structures with joints between every two cylindrical structures fully-circumferentially welded, parts are likely to deform during welding, and tolerance accuracy is influenced accordingly. However, it is difficult to measure geometric tolerances including a perpendicularity and an angle of the femur parts efficiently and accurately. In addition, since the femur parts are connected to a pelvis and knee joints of the dummy, their deviations in terms of the perpendicularity and angle have a crucial impact on the dynamic responses of a femur structure and even an overall structure of the crash dummy, and will eventually lead to deviations of overall quality characteristic parameters of the crash dummy and affect the accuracy of a vehicle crash test if not found in time. An existing tolerance measuring jig is likely to damage the surface accuracy of the femur parts. To this end, a tool and a method for measuring a perpendicularity and an angle of a femur of a vehicle crash dummy are provided for solving the above problems.

SUMMARY

In order to solve the above defects or deficiencies in the prior art, a tool and a method for measuring a perpendicularity and an angle of a femur of a vehicle crash dummy are to be provided to facilitate timely measurement of a perpendicularity and an angle, protect the surface precision of a femur part and improve the machining precision of the femur part of the crash dummy.

In a first aspect, the present disclosure provides a tool for measuring a perpendicularity and an angle of a femur of a vehicle crash dummy. The tool includes:
  a base, where the base is provided with a guide ring gear;
  a clamp assembly, where the clamp assembly includes a rotary table that is rotatably connected to and concentrically arranged with the guide ring gear; the rotary table is provided with a drive member, and the drive member is provided with a first drive end and a second drive end that synchronously rotate; and the first drive end is provided with a rotary gear, the rotary gear is in meshing connection to the guide ring gear, and the second drive end is provided with a worm;
  the rotary table is further provided with a worm ring gear that is concentrically arranged with and rotatably connected to the rotary table, and the worm ring gear meshes with the worm; the worm ring gear is internally provided with an inner ring gear, an inner side of the worm ring gear is provided with a limit assembly, and the limit assembly is provided with a limit end abutting between two adjacent tooth tips of the inner ring gear; and the inner ring gear is in internal meshing connection to at least three cams that are evenly distributed, and an accommodation space is formed among the cams for accommodating a positioning portion of a femur part; and
  under the condition that the drive member drives the rotary gear and the worm to synchronously rotate, the rotary table is driven to rotate relative to the guide ring gear, and simultaneously the worm ring gear and the inner ring gear are driven to rotate, such that the cams are driven to rotate to clamp the positioning portion of the femur part.

In a second aspect, the present disclosure provides a method for measuring a perpendicularity and an angle of a femur of a vehicle crash dummy implemented based on the tool described above. The method includes:
  driving a rotary gear and a worm to synchronously rotate by a drive member, and driving a rotary table to rotate relative to a guide ring gear; measuring a real-time distance between a first measurement end and a femoral connection surface of a femur part and outputting a first distance set by the first measurement end; and measuring a real-time distance between a second measurement end and a knee joint connection surface of the femur part and outputting a second distance set and a third distance set by the second measurement end;
  obtaining a maximum first distance and a minimum first distance in the first distance set, and computing a first difference;
  obtaining a first linear distance between the first measurement end and a positioning axis of the femur part;
  computing a perpendicularity tolerance according to the first linear distance and the first difference;
  obtaining a maximum second distance in the second distance set and a maximum third distance in the third distance set, and computing a second difference;
  obtaining a second linear distance between two second measurement ends;
  computing an angle tolerance according to the second difference and the second linear distance; and
  determining that the current femur part is qualified when the perpendicularity tolerance falls within a perpendicularity error interval and the angle tolerance falls within an angle error interval.

To sum up, according to the present disclosure, the guide ring gear, the clamp assembly and a measurement assembly are designed on the base, and the clamp assembly includes the rotary table that is rotatably connected to and concentrically arranged with the guide ring gear. The drive member is arranged on the rotary table and is provided with the first drive end and the second drive end that synchronously rotate, the first drive end is provided with the rotary gear, and the rotary gear is in meshing connection to the guide ring gear. The second drive end is provided with the worm, the worm is in meshing connection to the worm ring gear, and the worm ring gear is in meshing connection to the rotary table. The worm ring gear is internally provided with the inner ring gear, the limit assembly is arranged between the inner ring gear and the worm ring gear, the inner ring gear is in internal meshing connection to at least three cams, and the accommodation space is formed among the three cams for accommodating the positioning portion of the femur part.

When in use, the drive member is started to drive the rotary gear and the worm to rotate. The rotary gear may move along the guide ring gear and drive the rotary table to rotate when rotating, and the worm may drive the worm ring gear to rotate when rotating. In addition, since the limit end of the limit assembly abuts between adjacent tooth tips of the inner ring gear, the inner ring gear and the worm ring gear simultaneously rotate, the worm ring gear may drive the three cams to rotate in turn when rotating, the cams gradually approach the positioning portion of the femur part until the three cams clamp the positioning portion, and then clamping is completed. When the drive member continues to run, the worm may merely continuously drive the worm ring gear to rotate when rotating since reaction force exerted by the femur part on the cams is transmitted to the inner ring gear. Under the action of reaction force of the inner ring gear and rotation force of the worm ring gear, the limit end of the limit assembly merely jumps between tooth tips of the inner ring gear without completely abutting against the inner ring gear, the inner ring gear and the worm ring gear may not simultaneously rotate, and the rotary gear may drive the rotary table to rotate and keep the femur part rotate in situ when continuously rotating. In this way, the measurement assembly can measure the perpendicularity and the angle of the femur part conveniently, and the surface precision of the femur part can be protected.

BRIEF DESCRIPTION OF THE DRAWINGS

Other features, objectives, and advantages of the present disclosure will become more apparent by reading the detailed description of non-limitative examples with reference to the following accompanying drawings.

DETAILED DESCRIPTION OF THE EMBODIMENTS

The present disclosure will be further described in detail below with reference to accompanying drawings and in conjunction with examples. It can be understood that particular examples described herein are merely used to explain relevant disclosure, rather than limit the present disclosure. In addition, it should be further noted that merely the parts related to the present disclosure are shown in the accompanying drawings for the convenience of description.

It should be noted that examples in the present disclosure and features therein can be combined with one another if there is no conflict. The present disclosure will be described in detail below with reference to the accompanying drawings and in conjunction with the examples.

Example 1

Figure 1A:
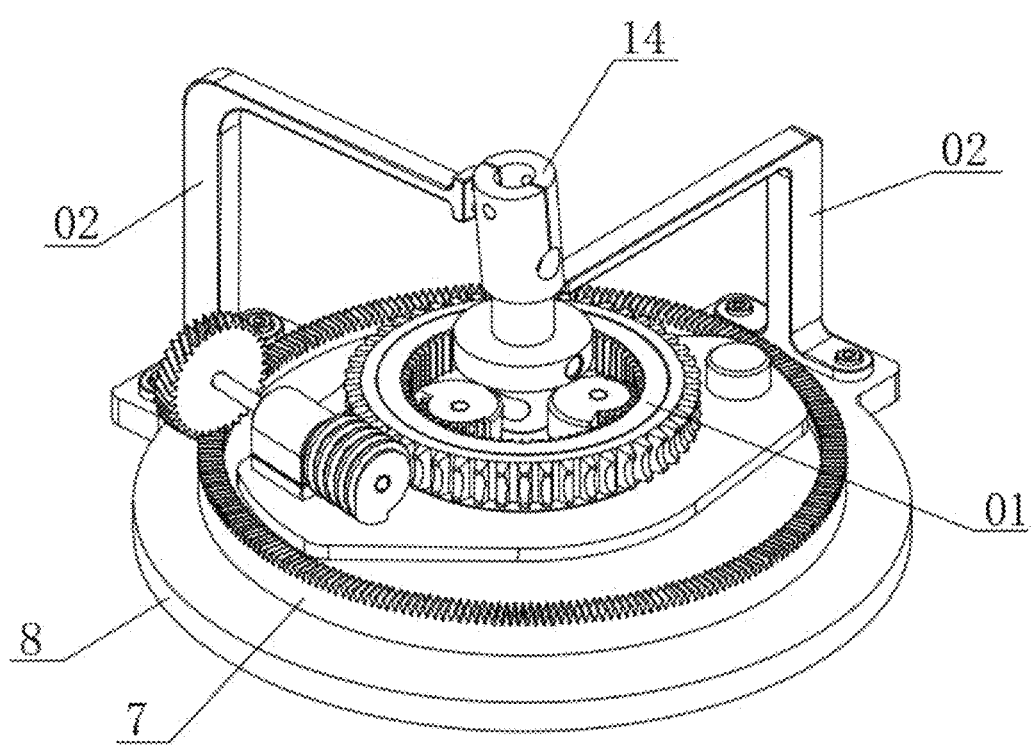
FIG. 1a is a first schematic diagram of an overall structure of a tool for measuring a perpendicularity and an angle of a femur of a vehicle crash dummy.
Figure 1B:
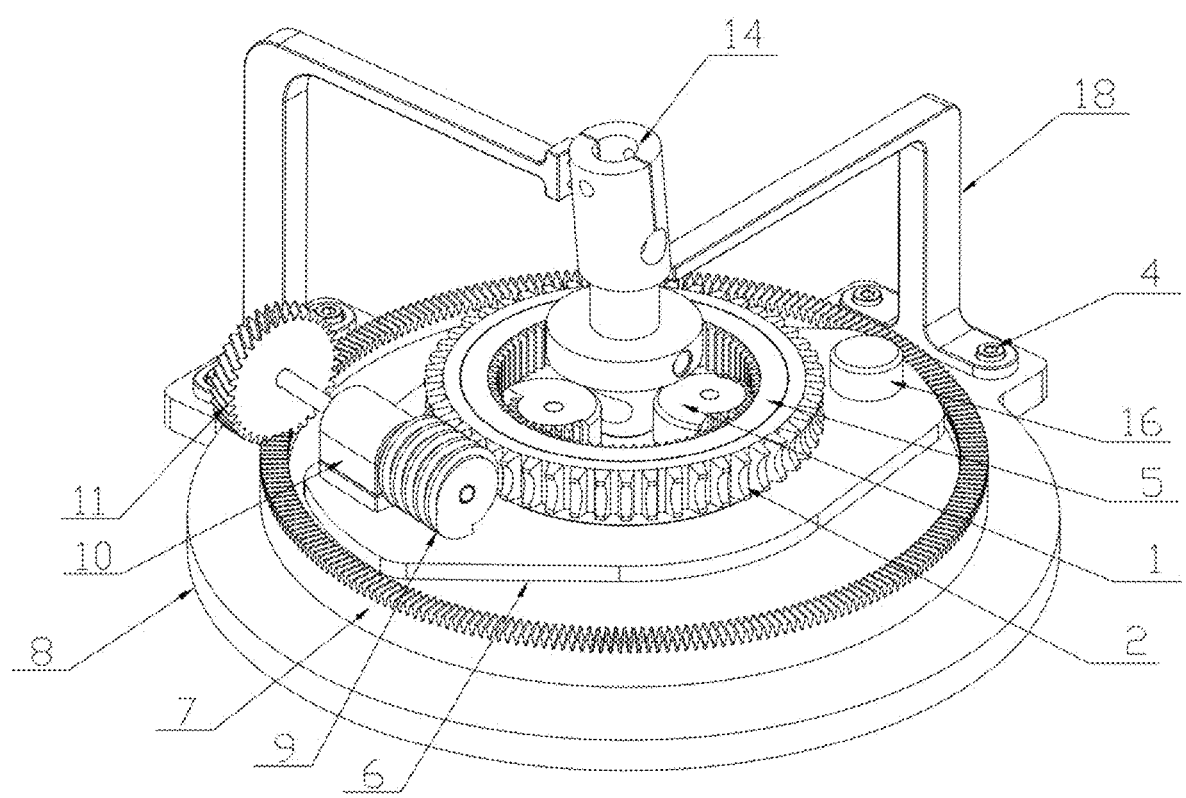
FIG. 1B is a second schematic diagram of an overall structure of a tool for measuring a perpendicularity and an angle of a femur of a vehicle crash dummy.
Figure 2A:
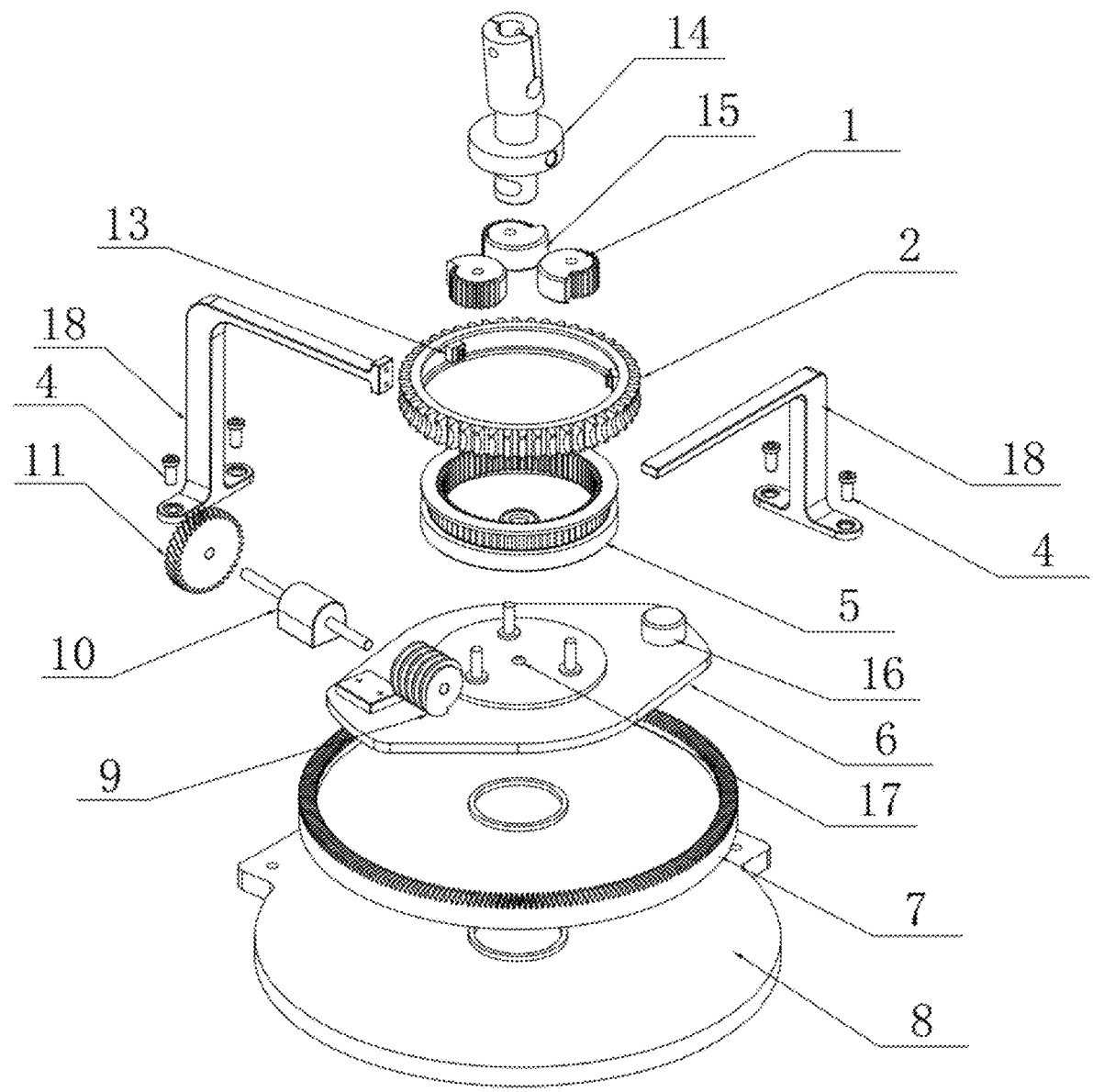
FIG. 2a is an exploded view of a tool.

With reference to FIGS. 1a, 1b and 2a, the present disclosure provides a tool for measuring a perpendicularity and an angle of a femur of a vehicle crash dummy. The tool includes:

a base 8 serving as a pedestal of the tool and configured to mount and bear a clamp assembly 01 and a measurement assembly 02, where the base 8 is provided with a guide ring gear 7, and a plurality of tooth tips of the guide ring gear 7 are distributed in a circumferential direction, such that a rotary gear 11 is allowed to mesh with the guide ring gear 7 and reciprocate in a circumferential direction of the guide ring gear 7; and the clamp assembly 01 configured to clamp a femur part 14, where the clamp assembly 01 includes a rotary table 6 that is rotatably connected to and concentrically arranged with the guide ring gear 7. In this case, the guide ring gear 7 and the rotary table 6 may be connected through a thrust bearing, and the thrust bearing is located in a center of the guide ring gear 7. Specifically, the thrust bearing is provided with an inner ring and an outer ring, the inner ring is connected to a bottom of the rotary table 6, and the outer ring is connected to a surface of the guide ring gear 7, such that the rotary table 6 may rotate relative to the guide ring gear 7 while ensuring that the rotary table and the guide ring gear keep relatively stationary in a vertical direction. The vertical direction in this case means a direction in which a central axis of the guide ring gear 7 is located.

The rotary table 6 is provided with a drive member 10. As shown in FIG. 2c, the drive member 10 is provided with a first drive end 10-1 and a second drive end 10-2 that synchronously rotate. The first drive end 10-1 is provided with the rotary gear 11, the rotary gear 11 is in meshing connection to the guide ring gear 7, and the second drive end 10-2 is provided with a worm 9. After the drive member 10 is started, the drive member may drive the first drive end 10-1 and the second drive end 10-2 to synchronously rotate. In this case, the rotary gear 11 rotates and moves in the circumferential direction of the guide ring gear 7, and since the drive member 10 is mounted and fixed on the rotary table 6, the rotary table 6 may rotate relative to the guide ring gear 7 when the rotary gear 11 moves in the circumferential direction of the guide ring gear 7. In this case, a type of the drive member 10 includes, for example, a double-ended motor having a model including YT801-2.

The rotary table 6 is further provided with a worm ring gear 2 that is concentrically arranged with and rotatably connected to the rotary table 6, and the worm ring gear 2 is in meshing connection to the worm 9. After the drive member 10 is started, the first drive end 10-1 and the second drive end 10-2 can be driven to synchronously rotate. In this case, the worm 9 rotates, and can drive the worm ring gear 2 to rotate.

Figure 7:
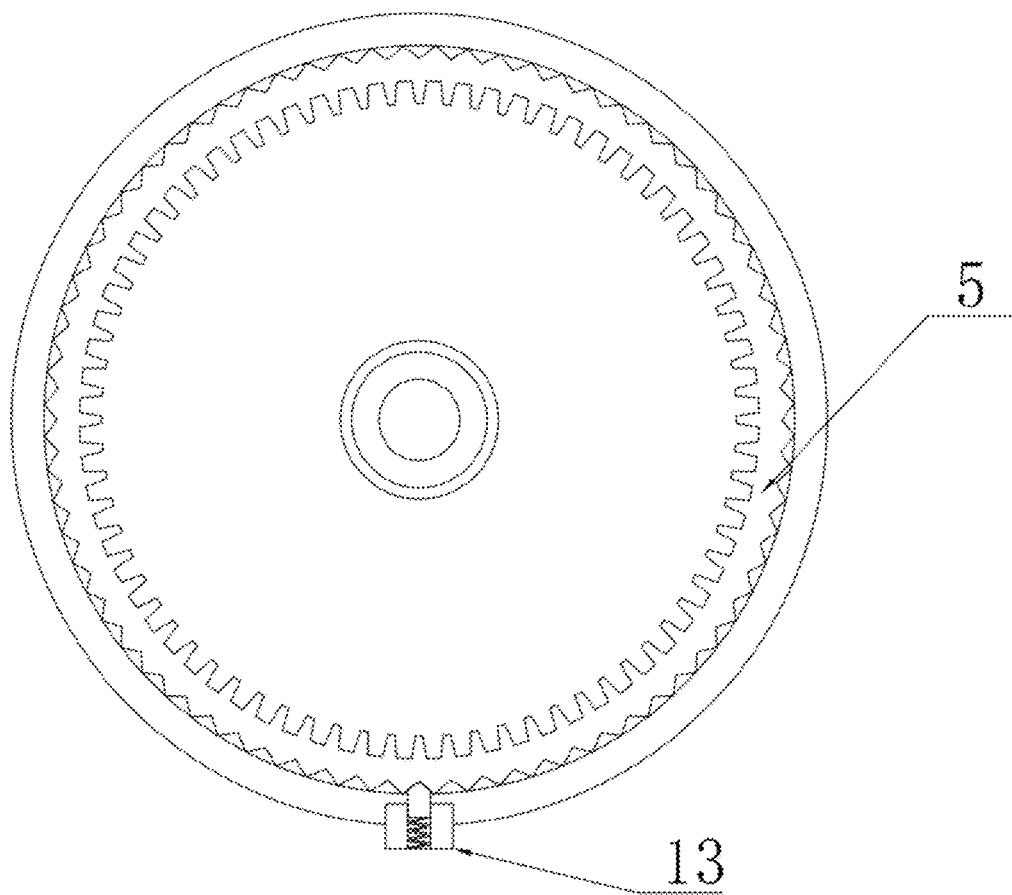
FIG. 7 is a schematic structural diagram of a limit assembly and an inner ring gear.

The worm ring gear 2 is internally provided with an inner ring gear 5, and an inner side of the worm ring gear 2 is provided with a limit assembly 13. As shown in FIG. 7, the limit assembly 13 is provided with a limit end 13-1a, and the limit end may abut between two adjacent tooth tips of the inner ring gear 5. When it is necessary to clamp the femur part 14, the limit assembly 13 indirectly connects the inner ring gear 5 to the worm ring gear 2, the worm 9 drives the worm ring gear 2 to rotate, and the inner ring gear 5 simultaneously rotates along with the worm ring gear 2.

The inner ring gear 5 is in internal meshing connection to at least three cams 1 that are evenly distributed, and an accommodation space is formed among the cams 1 for accommodating a positioning portion 14-1 of the femur part 14. The femur part 14 has a structure as shown in FIG. 2d.

When it is necessary to clamp the femur part 14, the drive member 10 drives the rotary gear 11 and the worm 9 to synchronously rotate, the rotary table 6 may be driven to rotate relative to the guide ring gear 7, and the worm ring gear 2 and the inner ring gear 5 are simultaneously driven to rotate, such that the cams 1 are driven to rotate to clamp the positioning portion 14-1 of the femur part 14.

Further, as shown in FIGS. 1a and 1b, the tool further includes a measurement assembly 02, where the measurement assembly 02 is arranged on the base 8.

Figure 8:
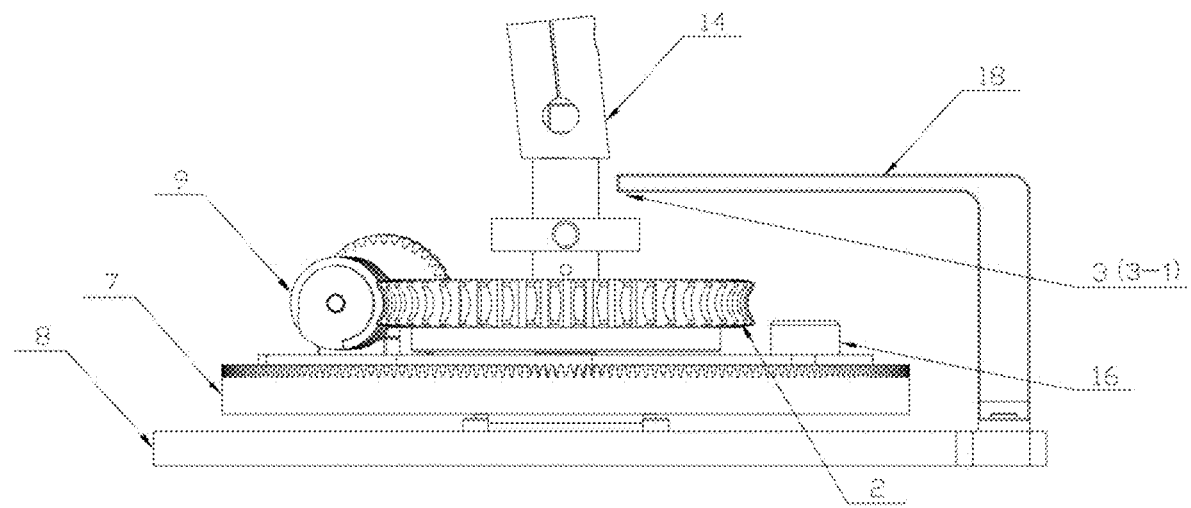
FIG. 8 is a schematic diagram showing measurement of a distance between a first distance measurement member and a femoral connection surface by the first distance measurement member.
Figure 9:
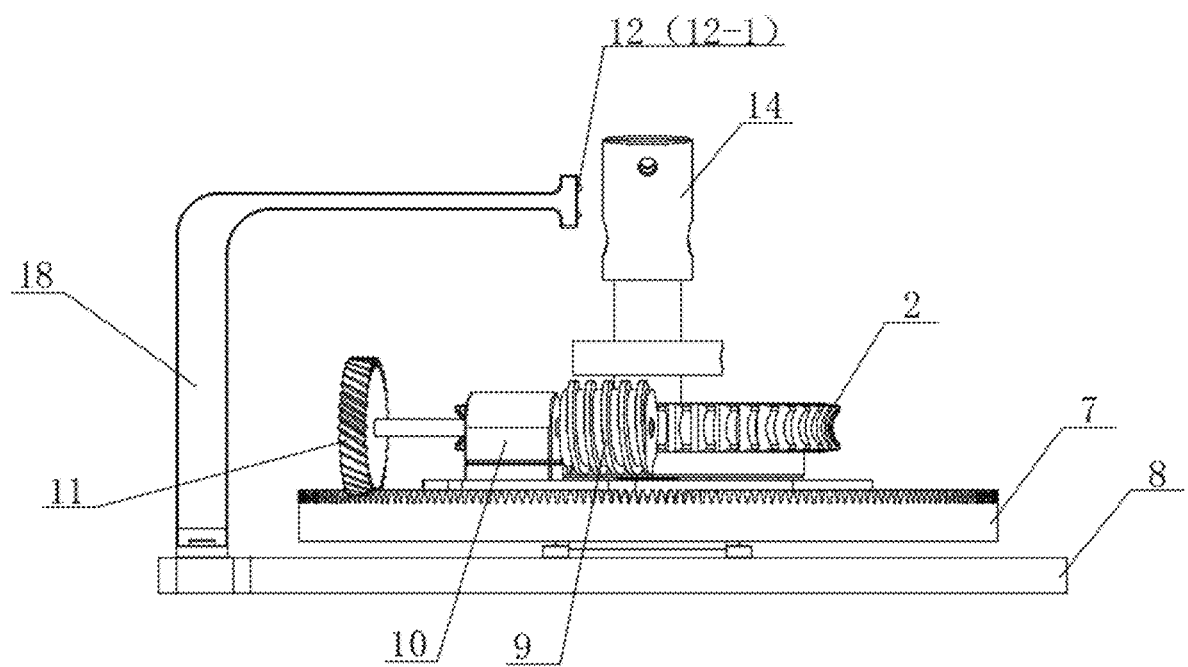
FIG. 9 is a schematic diagram showing measurement of a distance between a second distance measurement member and a knee joint connection surface by the second distance measurement member.

The measurement assembly 02 includes:
a first distance measurement member 3 as shown in FIG. 8, where the first distance measurement member 3 is provided with a first measurement end 3-1, a measurement direction of the first measurement end 3-1 faces a femoral connection surface 14-2 of the femur part 14, and the first measurement end 3-1 is configured to measure a distance between the first measurement end and the femoral connection surface 14-2 of the femur part 14; and
at least two second distance measurement member 12 as shown in FIG. 9, where the second distance measurement member 12 is provided with a second measurement end 12-1, a measurement direction of the second measurement end 12-1 faces a knee joint connection surface 14-3 of the femur part 14, and the second measurement end 12-1 is configured to measure a distance between the second measurement end and the knee joint connection surface 14-3 of the femur part 14.

In this case, types of the first distance measurement member 3 and the second distance measurement member 12 include, for example, a laser displacement sensor having models including PANASONIC HG-C1400-P.

As shown in FIG. 2, the first distance measurement member 3 and the second distance measurement member 12 are mounted on two mounting supports 18 respectively, and the mounting supports 18 are connected to the base 8 through bolts 4, such that the first distance measurement member 3 and the second distance measurement member 12 are mounted on the base 8.

Figure 2B:
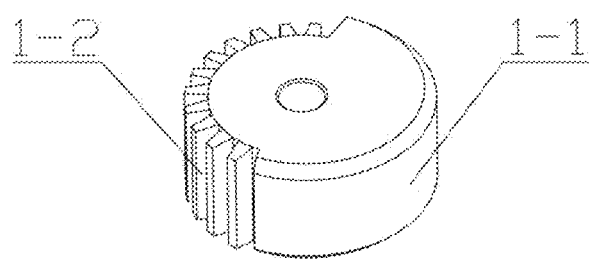
FIG. 2b is a schematic structural diagram of a cam.
Figure 2C:
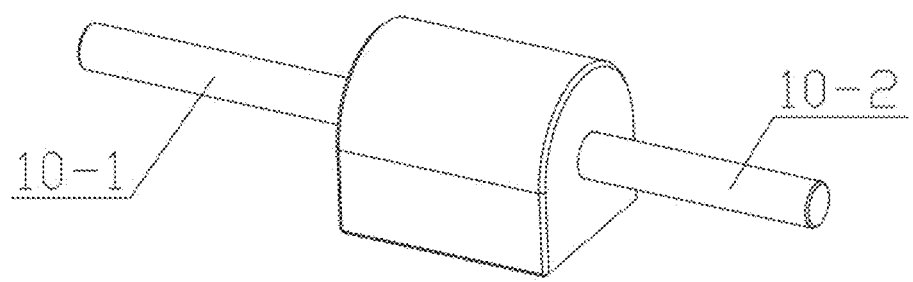
FIG. 2c is a schematic structural diagram of a drive member.
Figure 2D:
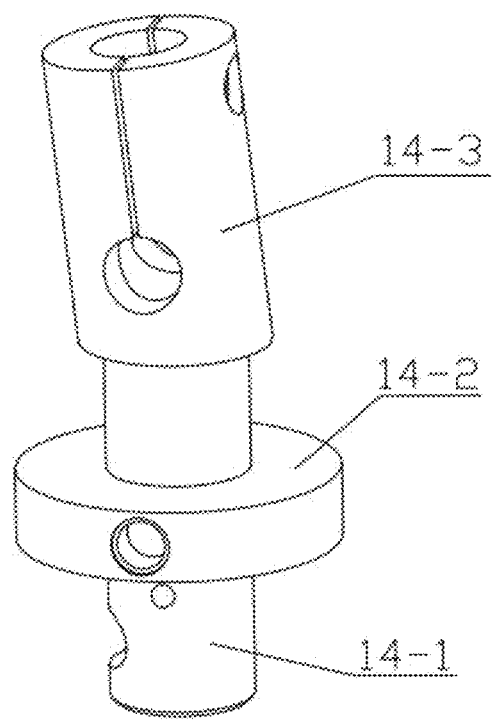
FIG. 2d is a schematic structural diagram of a femur part.

Further, as shown in FIGS. 2a and 2b, the cam 1 includes:
a convex portion 1-1 and a meshing portion 1-2, where a surface of the convex portion 1-1 may be closely attached to a surface of the positioning portion 14-1 of the femur part 14, and the meshing portion 1-2 is in meshing connection to the inner ring gear 5. The drive member 10 indirectly drives the cams 1 to rotate, that is, a tooth tip of the inner ring gear 5 may push the meshing portion 1-2, such that the cams 1 rotates until the convex portions 1-1 of the three cams 1 come into contact with and clamp the positioning portions 14-1 of the femur part 14. In this case, the positioning portion 14-1 of the femur part 14 includes, for example, a positioning pin of the femur part 14.

Further, as shown in FIG. 2, the tool further includes a protective layer 15, the protective layer 15 covers the surface of the convex portion 1-1, such that the condition that the convex portion 1-1 directly comes into contact with the femur part 14, and abrades the surface of the femur part 14 is prevented.

In this case, the protective layer 15 is made from a material including a thin rubber material.

Figure 3:
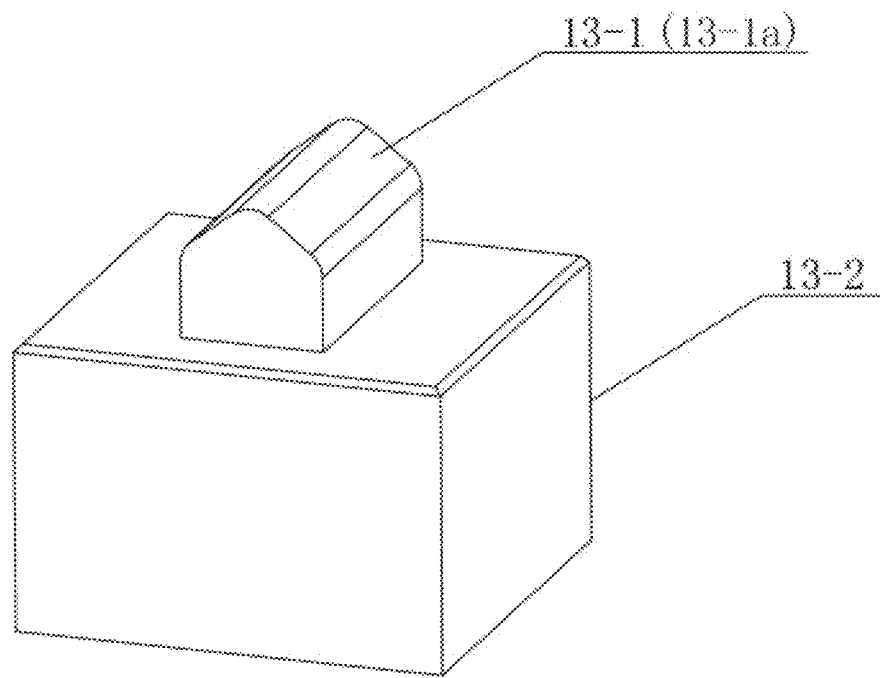
FIG. 3 is a schematic structural diagram of a limit assembly.
Figure 4:
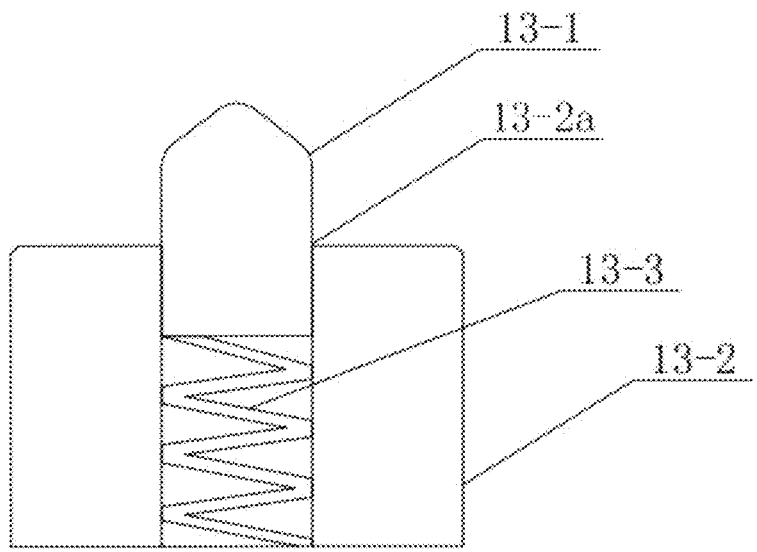
FIG. 4 is a sectional view of a limit assembly.

Further, at least three limit assemblies 13 are provided. As shown in FIG. 3, the limit assembly 13 includes:
a limit member 13-2, where the limit member 13-2 is arranged at an inner side of the worm ring gear 2, as shown in FIG. 4, the limit member 13-2 is provided with a mounting recess 13-2a, and a mouth of the mounting recess 13-2a is provided towards a center of the worm ring gear 2 and is configured to mount and accommodate a limit ejector pin 13-1; and
the limit ejector pin 13-1, where one end of the limit ejector pin 13-1 is connected to a bottom of the mounting recess 13-2a through an elastic element 13-3, and the other end of the limit ejector pin 13-1 serves as the limit end 13-1a, and may abut against two adjacent tooth tips of the inner ring gear 5.

In this case, a type of the elastic element 13-3 includes, for example, a spring.

Further, the tool further includes a counterweight member 16, where the counterweight member 16 and the drive member 10 are symmetrically arranged on the rotary table 6 with the central axis of the rotary table 6 as a center, the counterweight member 16 is configured to cooperate with the drive member 10 to keep the rotary table 6 balanced under stress, and the rotary table 6 may rotate smoothly when the drive member 10 drives the rotary gear 11 and the worm 9 to rotate.

In this case, a type of the counterweight member 16 includes, for example, a clump weight.

Further, as shown in FIG. 2, the tool further includes a positioning member 17, where the positioning member 17 is arranged on the rotary table 6, and the positioning member 17 is located in a center of the accommodation space and plays an auxiliary role in position adjustment of the femur part 14. Specifically, when the positioning portion 14-1 of the femur part 14 is in the accommodation space, the cams 1 rotate, and the convex portions 1-1 of the cams 1 gradually approach a side wall of the positioning portion 14-1 of the femur part 14. Since the three cams 1 simultaneously come into contact with and clamp the femur part 14 together, and the accommodation space is larger than the positioning portion 14-1 in size, the femur part 14 also moves in the accommodation space when the three cams 1 clamp the femur part 14. In this case, the positioning member 17 separates the femur part 14 from the rotary table 6, reducing a contact area between the femur part 14 and the rotary table 6, and facilitating adjusting the position of the femur part 14, such that the three cams 1 can stably clamp the femur part 14, and an axis of the femur part 14 coincides with the central axis of the rotary table 6.

In this case, a type of the positioning member 17 includes, for example, a hemispherical pad made from rubber, such that abrasion to the surface of the positioning portion 14-1 of the femur part 14 can be avoided.

A specific working process of the tool is as follows.

Figure 5:
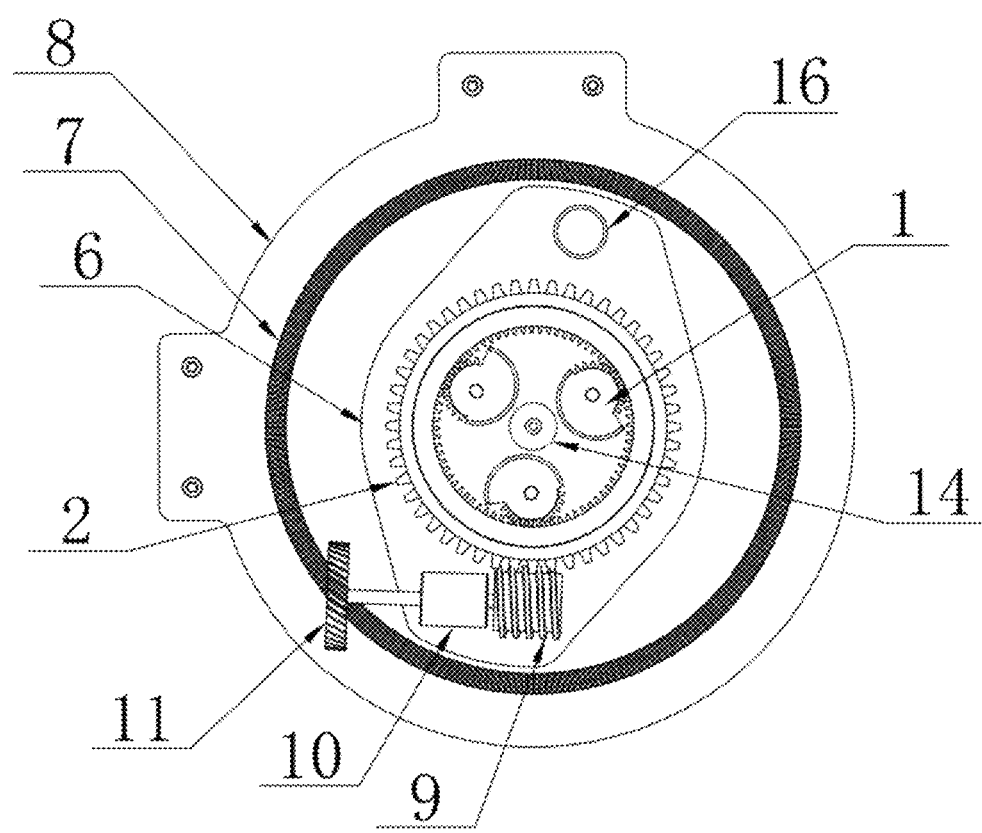
FIG. 5 is a schematic diagram of a clamp assembly not clamping a femur part.
Figure 6:
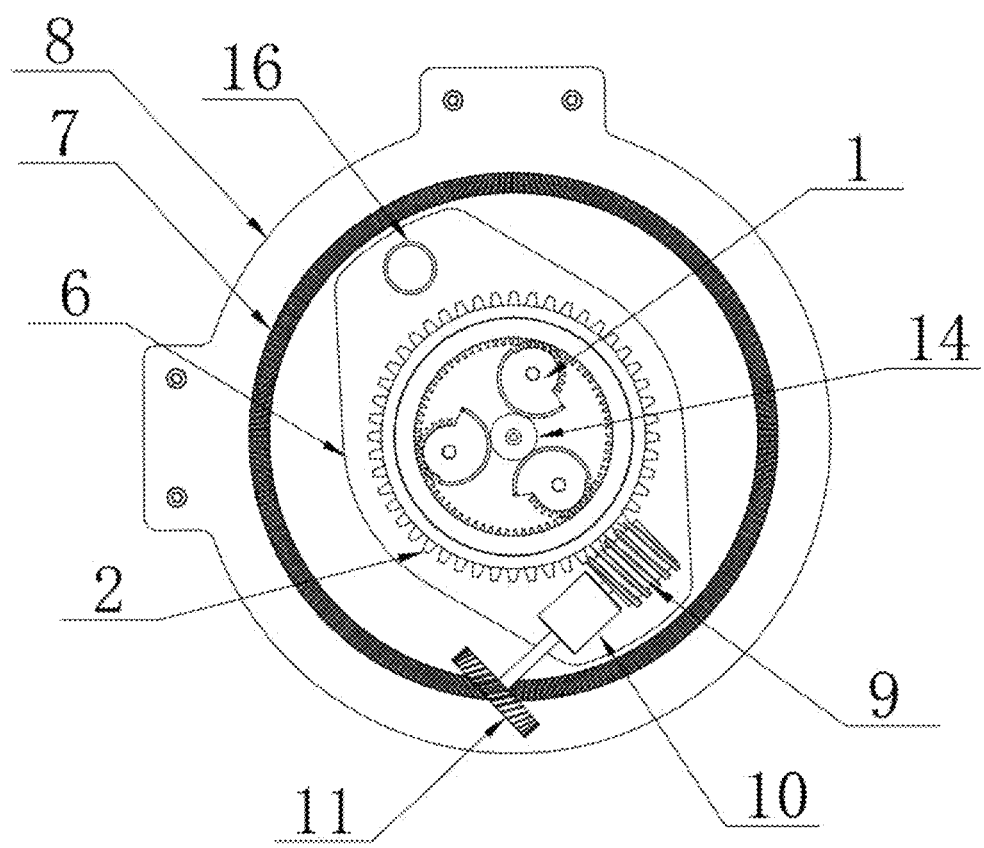
FIG. 6 is a schematic diagram of a clamp assembly clamping a femur part.

FIG. 5 is a schematic diagram of a clamp assembly 01 not clamping a femur part 14. The accommodation space is formed among the three cams 1 to accommodate the positioning portion 14-1 of the femur part 14. When it is necessary to clamp the femur part 14, the drive member 10 is started, the drive member 10 drives the rotary gear 11 and the worm 9 to synchronously rotate, and the rotary gear 11 meshes with the guide ring gear 7. The rotary gear 11 may move along the guide ring gear 7 when rotating, and the rotary table 6 may be driven to rotate accordingly. Since the tool is in a state as shown in FIG. 5, the limit ejector pin 13-1 of the limit assembly 13 abuts between two adjacent tooth tips of the inner ring gear 5. The worm 9 may drive the worm ring gear 2 to rotate when rotating, and the worm ring gear 2 and the inner ring gear 5 simultaneously rotate, such that the three cams 1 are driven to rotate, and the convex portions 1-1 of the cams 1 gradually approach the positioning portion 14-1 of the femur part 14 until the three cams 1 clamp the positioning portion 14-1 of the femur part 14, as shown in FIG. 6.

After the femur part 14 is clamped based on the above process, the femur part 14 is measured, and the drive member 10 continues to drive the rotary gear 11 and the worm 9 to rotate. In this case, reaction force exerted by the femur part 14 on the cams 1 is transmitted to the inner ring gear 5, the worm 9 may merely drive the worm ring gear 2 to rotate when rotating. Under the action of reaction force of the inner ring gear 5 and rotation force of the worm ring gear 2, the limit ejector pin 13-1 merely jumps between the tooth tips of the inner ring gear 5 without completely abutting against the inner ring gear 5, and the inner ring gear 5 and the worm ring gear 2 may not simultaneously rotate, that is, friction force, between the inner ring gear 5 and the worm ring gear 2, of the limit assembly 13 is insufficient to keep the inner ring gear 5 continue to rotate together with the worm ring gear 2, such that overload protection is formed. On one hand, constant clamp force can be formed on the femur part 14, so as to stably clamp the femur part 14. On the other hand, the drive member 10 can simultaneously play a driving role in a clamping process and a measurement process without affecting normal clamping and measurement operations. The rotary gear 11 may drive the rotary table 6 to rotate and keep the femur part 14 rotate in situ when continuously rotating. In this way, the first distance measurement member 3 and the second distance measurement member 12 may conveniently measure the femoral connection surface 14-2 and the knee joint connection surface 14-3 of the femur part 14 respectively, timely measurement of the perpendicularity and the angle is facilitated, and the surface precision of the femur part is protected.

Example 2

Figure 10:
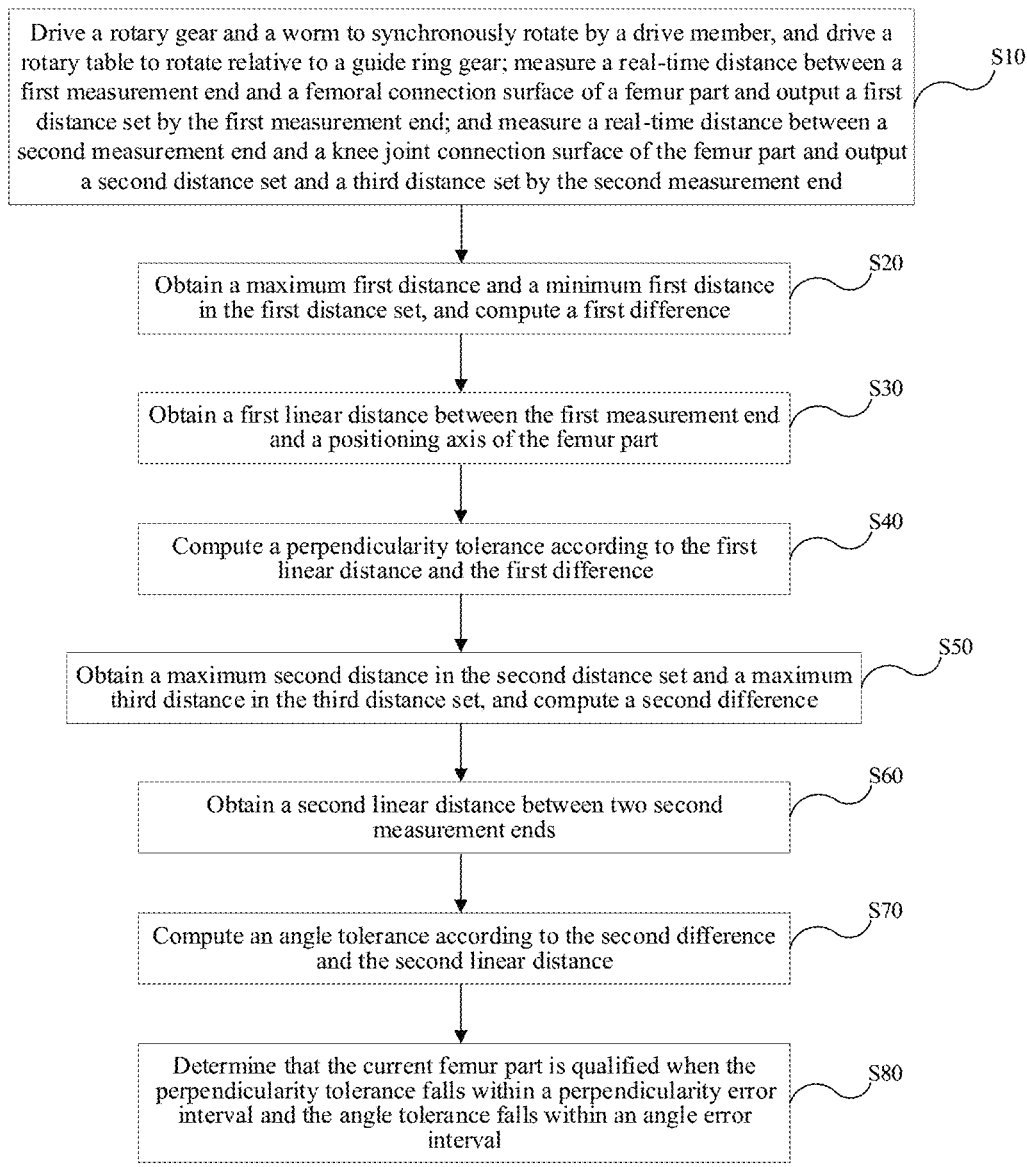
FIG. 10 is a schematic flowchart of a method for measuring a perpendicularity and an angle of a femur of a vehicle crash dummy.

As shown in FIG. 10, the present disclosure further provides a method for measuring a perpendicularity and an angle of a femur of a vehicle crash dummy implemented based on the tool according Example 1. The method includes:

S10. A drive member 10 drives a rotary gear 11 and a worm 9 to synchronously rotate, and a rotary table 6 is driven to rotate relative to a guide ring gear 7. A first measurement end 3-1 measures a real-time distance between the first measurement end and a femoral connection surface 14-2 of a femur part 14 and outputs a first distance set. A second measurement end 12-1 measures a real-time distance between the second measurement end and a knee joint connection surface 14-3 of the femur part 14 and outputs a second distance set and a third distance set.

Specifically, the real-time distance between the first measurement end 3-1 and the femoral connection surface 14-2 of the femur part 14 is measured by the first measurement end, and the real-time distance between the second measurement end 12-1 and the knee joint connection surface 14-3 of the femur part 14 is measured by the second measurement end. The real-time distances are transmitted to a control module, and the control module may generate a first distance set, a second distance set and a third distance set.

The first distance set is $\{L_{a1}, L_{a2}, L_{a3}, \ldots L_{am}\}$, where $L_{am}$ denotes an $m^{th}$ distance, measured by the first measurement end 3-1, between the first measurement end 3-1 and the femoral connection surface 14-2 of the femur part 14.

The second distance set is $\{L_{b1}, L_{b2}, L_{b3}, \ldots L_{bm}\}$, where $L_{bm}$ denotes an $m^{th}$ distance, measured by the second measurement end 12-1, between the second measurement end and the knee joint connection surface 14-3 of the femur part 14.

The third distance set is $\{L_{c1}, L_{c2}, L_{c3}, \ldots L_{cm}\}$, where $L_{cm}$ denotes an $m^{th}$ distance, measured by the other second measurement end 12-1, between the other second measurement end and the knee joint connection surface 14-3 of the femur part 14.

It should be noted that the femur part 14 is clamped on the rotary table 6 and starts to rotate under the action of the drive member 10. The rotary table 6 rotates at a speed of n, the rotary table 6 is set to take t seconds to rotate by every 7°, and the first measurement end 3-1 or the second measurement end 12-1 measures once the distance between the first measurement end and the femoral connection surface 14-2 or between the second measurement end and the knee joint connection surface 14-3 by every 7° of rotation, where t=7/6n.

In this case, a type of the control module includes, for example, a Core processor i9-9880XE.

Further, after the step that a drive member 10 drives a rotary gear 11 and a worm 9 to synchronously rotate and before the step that a real-time distance between a first measurement end 3-1 and a femoral connection surface 14-2 of a femur part 14 is measured by the first measurement end, the method further includes:

the rotary table 6 is driven to rotate relative to the guide ring gear 7 by the drive member 10, a worm ring gear 2 and an inner ring gear 5 are simultaneously driven to rotate, and the inner ring gear 5 drives cams 1 to rotate and clamp a positioning portion 14-1 of the femur part 14 to be tested.

S20. The control module obtains a maximum first distance and a minimum first distance in the first distance set, and computes a first difference.

The maximum first distance is $L_{a\ max}=\text{MAX}\{L_{a1}, L_{a2}, L_{a3}, \ldots L_{am}\}$.

The minimum first distance is $L_{a\ min}=\text{MIN}\{L_{a1}, L_{a2}, L_{a3}, \ldots L_{am}\}$.

The first difference is $\sigma_1=|L_{a\ max}-L_{a\ min}|$.

S30. A first linear distance between the first measurement end 3-1 and a positioning axis of the femur part 14 is obtained.

The positioning axis of the femur part 14 is a central axis of the femur part 14 after the three cams 1 clamp the femur part 14, and is also a central axis of the rotary table 6.

The first linear distance may be measured by a tool including a vernier caliper.

S40. The control module computes a perpendicularity tolerance according to the first linear distance and the first difference.

The perpendicularity tolerance is computed according to formula (I) as follows:

$$\theta = \arctan\frac{\sigma_1}{2s_1}; \quad \text{Formula (I)}$$

where $\theta$ denotes the perpendicularity tolerance, $\sigma_1$ denotes the first difference and $s_1$ denotes the first linear distance.

S50. The control module obtains a maximum second distance in the second distance set and a maximum third distance in the third distance set, and computes a second difference.

The maximum second distance is $L_{b\ max}=\text{MAX}\{L_{b1}, L_{b2}, L_{b3}, \ldots L_{bm}\}$.

The maximum third distance is $L_{c\ max}=\text{MAX}\{L_{c1}, L_{c2}, L_{c3}, \ldots L_{cm}\}$.

The second difference is $\sigma_2=|L_{b\ max}-L_{c\ max}|$.

S60. A second linear distance between two second measurement ends 12-1 is obtained.

The second linear distance may be measured by a tool including a vernier caliper.

S70. The control module computes an angle tolerance according to the second difference and the second linear distance.

The angle tolerance is computed according to formula (II) as follows:

$$\beta = \arctan\frac{\sigma_2}{s_2}; \quad \text{Formula (II)}$$

where $\beta$ denotes the angle tolerance, $\sigma_2$ denotes the second difference and $s_2$ denotes the second linear distance.

S80. It is determined that the current femur part 14 is qualified when the perpendicularity tolerance falls within a perpendicularity error interval and the angle tolerance falls within an angle error interval.

The perpendicularity error interval may range from 0.05 mm to 0.1 mm, and the angle error interval may range from 0.05° to 0.1°. In addition, the same femur part 14 may be measured many times, and is re-clamped and re-measured each time, such that multiple measurement data are obtained to improve the production and machining accuracy of the femur part 14.

What is described above is merely explanation of preferred examples of the present disclosure and applied technical principles. It should be understood by those skilled in the art that the scope of application involved in the present disclosure is not limited to a technical solution formed by a specific combination of the technical features described above, but should further cover other technical solutions formed by any random combination of the technical features described above or their equivalent features without departing from the inventive concepts, for example, a technical solution formed by interchanging the features described above and (non-limitative) technical features having similar functions as disclosed in the present disclosure.

What is claimed is:

1. A tool for measuring a perpendicularity and an angle of a femur of a vehicle crash dummy, comprising:
    a base, wherein the base is provided with a guide ring gear; and
    a clamp assembly, wherein
    the clamp assembly comprises a rotary table that is rotatably connected to and concentrically arranged with the guide ring gear; the rotary table is provided with a drive member, and the drive member is provided with a first drive end and a second drive end that synchronously rotate; and the first drive end is provided with a rotary gear, the rotary gear is in meshing connection to the guide ring gear, and the second drive end is provided with a worm;
    the rotary table is further provided with a worm ring gear that is concentrically arranged with and rotatably connected to the rotary table, and the worm ring gear meshes with the worm; the worm ring gear is internally provided with an inner ring gear, an inner side of the worm ring gear is provided with a limit assembly, and the limit assembly is provided with a limit end abutting between two adjacent tooth tips of the inner ring gear; and the inner ring gear is in internal meshing connection to at least three cams that are evenly distributed, and an accommodation space is formed among the cams for accommodating a positioning portion of a femur part;
    under the condition that the drive member drives the rotary gear and the worm to synchronously rotate, the rotary table is driven to rotate relative to the guide ring gear, and simultaneously, the worm ring gear and the inner ring gear are driven to rotate, such that the cams are driven to rotate to clamp the positioning portion of the femur part; and
    the tool further comprises a measurement assembly, wherein the measurement assembly is arranged on the base; and
    the measurement assembly comprises:
    a first distance measurement member, wherein the first distance measurement member is provided with a first measurement end, and the first measurement end is configured to measure a distance between the first measurement end and a femoral connection surface of the femur part; and
    at least two second distance measurement members, wherein the second distance measurement member is provided with a second measurement end, and the second measurement end is configured to measure a distance between the second measurement end and a knee joint connection surface of the femur part.

2. The tool for measuring the perpendicularity and the angle of the femur of the vehicle crash dummy according to claim 1, wherein the cam comprises:
    a convex portion and a meshing portion, wherein a surface of the convex portion is closely attached to a surface of the positioning portion of the femur part, and the meshing portion is in meshing connection to the inner ring gear.

3. The tool for measuring the perpendicularity and the angle of the femur of the vehicle crash dummy according to claim 2, further comprising a protective layer, wherein the protective layer covers the surface of the convex portion.

4. The tool for measuring the perpendicularity and the angle of the femur of the vehicle crash dummy according to claim 1, wherein the limit assembly comprises:
   a limit member, wherein the limit member is arranged at an inner side of the worm ring gear, the limit member is provided with a mounting recess, and a mouth of the mounting recess is provided towards a center of the worm ring gear; and
   a limit ejector pin, wherein one end of the limit ejector pin is connected to a bottom of the mounting recess through an elastic element, and the other end of the limit ejector pin serves as the limit end.

5. The tool for measuring the perpendicularity and the angle of the femur of the vehicle crash dummy according to claim 1, further comprising a counterweight member, wherein the counterweight member and the drive member are symmetrically arranged on the rotary table with a central axis of the rotary table as a center.

6. The tool for measuring the perpendicularity and the angle of the femur of the vehicle crash dummy according to claim 1, further comprising a positioning member, wherein the positioning member is arranged on the rotary table, and the positioning member is located in a center of the accommodation space.

7. A method for measuring a perpendicularity and an angle of a femur of a vehicle crash dummy implemented based on the tool for measuring the perpendicularity and the angle of the femur of the vehicle crash dummy according to claim 1, comprising:
   driving the rotary gear and the worm to synchronously rotate by the drive member, and driving the rotary table to rotate relative to the guide ring gear; measuring a real-time distance between the first measurement end and the femoral connection surface of the femur part and outputting a first distance set by the first measurement end; and measuring a real-time distance between the second measurement end and the knee joint connection surface of the femur part and outputting a second distance set and a third distance set by the second measurement end;
   obtaining a maximum first distance and a minimum first distance in the first distance set, and computing a first difference;
   obtaining a first linear distance between the first measurement end and the positioning axis of the femur part;
   computing a perpendicularity tolerance according to the first linear distance and the first difference;
   obtaining a maximum second distance in the second distance set and a maximum third distance in the third distance set, and computing a second difference;
   obtaining a second linear distance between two second measurement ends;
   computing an angle tolerance according to the second difference and the second linear distance; and
   determining that the current femur part is qualified when the perpendicularity tolerance falls within a perpendicularity error interval and the angle tolerance falls within an angle error interval.

8. The method for measuring the perpendicularity and the angle of the femur of the vehicle crash dummy according to claim 7, wherein after the driving the rotary gear and the worm to synchronously rotate by the drive member and before the measuring a real-time distance between the first measurement end and the femoral connection surface of the femur part by the first measurement end, the method further comprises:
   driving the rotary table to rotate relative to the guide ring gear by the drive member, and simultaneously driving the worm gear ring and the inner ring gear to rotate, and driving, by the inner ring gear, cams to rotate and clamp a positioning portion of the femur part to be tested.

9. The method for measuring the perpendicularity and the angle of the femur of the vehicle crash dummy according to claim 7, wherein the perpendicularity tolerance is computed according to formula (I) as follows:

$$\theta = \arctan\frac{\sigma_1}{2s_1}; \qquad \text{Formula (I)}$$

wherein $\theta$ denotes the perpendicularity tolerance, $\sigma_1$ denotes the first difference and $s_1$ denotes the first linear distance; and
the angle tolerance is computed according to formula (II) as follows:

$$\beta = \arctan\frac{\sigma_2}{s_2}; \qquad \text{Formula (II)}$$

wherein $\beta$ denotes the angle tolerance, $\sigma_2$ denotes the second difference and $s_2$ denotes the second linear distance.

* * * * *